United States Patent
Robinson et al.

(10) Patent No.: US 9,693,124 B2
(45) Date of Patent: Jun. 27, 2017

(54) MACRO-SWITCH WITH A BUFFERED SWITCHING MATRIX

(71) Applicant: Oracle International Corporation, Redwood Shores, CA (US)

(72) Inventors: Leick D. Robinson, Austin, TX (US); Avadh Pratham Patel, Cedar Park, CA (US); Ashok V. Krishnamoorthy, San Diego, CA (US); Alan P. Wood, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 15/154,619

(22) Filed: May 13, 2016

(65) Prior Publication Data

US 2016/0366498 A1 Dec. 15, 2016

Related U.S. Application Data

(60) Provisional application No. 62/173,190, filed on Jun. 9, 2015.

(51) Int. Cl.
*H04J 14/02* (2006.01)
*H04Q 11/00* (2006.01)
(Continued)

(52) U.S. Cl.
CPC ....... *H04Q 11/0062* (2013.01); *G02B 6/3542* (2013.01); *G02B 6/3596* (2013.01);
(Continued)

(58) Field of Classification Search
CPC ..... H04B 10/2504; H04B 10/40; H04J 14/02; H04J 14/0212; G02B 6/3542;
(Continued)

(56) References Cited

U.S. PATENT DOCUMENTS 7,356,213 B1 * 4/2008 Cunningham .......... H01L 23/48
257/E23.01
2009/0003827 A1 1/2009 Kai et al.
(Continued)

OTHER PUBLICATIONS

Xuezhe Zheng et al, "Optical Proximity Communication Using Reflective Mirrors" Optics Express, OSA (Optical Society of America), U.S. vol. 16, No. 19, Sep. 10, 2008, pp. 15052-15058, XP007906084, ISSN: 1094-4087, DOI: 10.1364/OE.16.015052 the whole document.
(Continued)

*Primary Examiner* — Dalzid Singh
(74) *Attorney, Agent, or Firm* — Park, Vaughan, Fleming & Dowler LLP (57) ABSTRACT

A macro-switch is described. This macro-switch includes facing integrated circuits, one of which implements optical waveguides that convey optical signals, and the other which implements control logic, electrical switches and memory buffers at each of multiple switch sites. Moreover, the macro-switch has a fully connected topology between the switch sites. Furthermore, the memory buffers at each switch site provide packet buffering and congestion relief without causing undue scheduling/routing complexity. Consequently, the macro-switch can be scaled to an arbitrarily large switching matrix (i.e., an arbitrary number of switch sites and/or switching stages).

20 Claims, 6 Drawing Sheets

(51) Int. Cl.
*G02B 6/35* (2006.01)
*H04B 10/40* (2013.01)
*H04B 10/25* (2013.01)

(52) U.S. Cl.
CPC ......... *H04B 10/2504* (2013.01); *H04B 10/40* (2013.01); *H04J 14/02* (2013.01); *H04J 14/0212* (2013.01); *H04Q 11/0005* (2013.01); *H04Q 2011/009* (2013.01)

(58) Field of Classification Search
CPC ............ G02B 6/3596; H04Q 11/0062; H04Q 11/0005; H04Q 2011/009
USPC ........................................................... 398/48
See application file for complete search history.

(56) References Cited

U.S. PATENT DOCUMENTS

| | | | | |
|---|---|---|---|---|
| 2011/0255822 A1* | 10/2011 | Zheng | ................. | G02B 6/3508 385/14 |
| 2012/0001166 A1* | 1/2012 | Doany | ................. | G02B 6/4246 257/43 |
| 2014/0268312 A1 | 9/2014 | Zheng et al. | | |
| 2015/0125112 A1* | 5/2015 | Frankel | ................. | H04B 10/271 385/16 |

OTHER PUBLICATIONS

T. J. Seok et al: "50×50 Digital Silicon Photonic Switches with MEMS-Actuated Adiabatic Couplers" Proceedings Optical Fiber Communication Conference, Mar. 2015, downloaded from IEEE Aug. 22, 2015, http://ieeexplore.ieee.org.libproxy.sdsu.edu/stamp/stamp.jsp?arnumber=7121463.

Mellanox Technologies: Mellanox CS7500 Produce Brief, Mellanox Technologies, downloaded from mellanox.com Aug. 22, 2015, http://www.mellanox.com/related-docs/prod_ib_switch_systems/pb_cs7500.pdf.

A. Krishnamoorthy et al: "Computer systems based on silicon photonic interconnects" Proceeding from IEEE vol. 97, No. 7, Jul. 2009. downloaded from IEEE Aug. 22, 2015, http://ieeexplore.ieee.org.libproxy.sdsu.edu/stamp/stamp.sp?arnumber=5071306.

P. Koka et al: "Silicon-photonic network architectures for scalable, power-efficient multi-chip systems" in ISCA, 2010, downloaded from acm.org on Aug. 22, 2015, http://dl.acm.org.libproxy.sdsu.edu/citation.cfm?d=1815977&CFID=884490268&CFTOKEN=62390216.

\* cited by examiner

MACRO-SWITCH WITH A BUFFERED SWITCHING MATRIX

CROSS-REFERENCE TO RELATED APPLICATION

This application claims priority under 35 U.S.C. §119(e) to U.S. Provisional Application Ser. No. 62/173,190, entitled "Macro-Switch: A Scalable Space and Memory Switch Based on Sense Integration," by Alan Wood, Avadh Patel, Leick Robinson and Ashok V. Krishnamoorthy, filed on Jun. 9, 2015, the contents of which are herein incorporated by reference.

GOVERNMENT LICENSE RIGHTS

This invention was made with U.S. Government support under Agreement No. HR0011-08-9-0001 awarded by DARPA. The U.S. Government has certain rights in the invention.

BACKGROUND

Field

The present disclosure relates to techniques for communicating optical signals. More specifically, the present disclosure relates to an optical cross-point macro-switch with a buffered switching matrix.

Related Art

Multistage Clos packet-switching networks are widely used in computing and telecommunications switching and routing systems to provide shared interconnectivity among many distinct endpoints or ports in these systems. In particular, these packet-switching networks are typically implemented as space-division switches that can scale to thousands of ports. However, because of input and output port contention, there is often an efficiency loss when such systems are scaled up, even in non-blocking Clos networks. This contention can be removed by using buffered switching nodes within each stage, so that all the intermediate nodes can store packets, thereby alleviating head-of-line blocking and/or output port blocking.

While fabricating buffered switches is usually difficult and expensive and it can be difficult to scale such architectures, the use of packet buffers before and/or after the switch has been demonstrated. The former is usually referred to as 'input queuing' or 'virtual output queuing,' and it typically removes head-of-line blocking so that any packet that can be routed from a specific input port does not have to wait in a queue for other packets destined for other destination ports to be routed first. Consequently, this approach can alleviate congestion at the input ports. Moreover, in the latter technique queues are used after the switch to reduce congestion within the network because of output-port congestion. Such memory buffers may also be used before and/or after the network in order to reduce head-of-line blocking, as well as to reduce switch contention because of output port blocking. However, the efficiency of the network is generally limited, and careful (and relatively complex) scheduling techniques may be needed to ensure that the network is not overloaded or pushed past its critical loading into an inefficient operating regime.

It is known that the use of memory buffers at all stages in a switch can lead to 100% switch utilization. However, it has proven difficult to implement such switches because each stage may have not only routing and forwarding functionality, but may also have memory buffers and rich connectivity to preceding and following switching/routing stages. Moreover, the need for memory at each stage may directly compete with the number of switches per stage and the number of stages that can be implemented. Therefore, the use of memory buffers at all stages in the switch may constrain the scalability of the switch.

Because of these challenges, pure space-division switching typically introduces too much competition between packets within the stages of a switching network and can cripple the overall system performance. Buffer memory is sometimes used before or after a switch to alleviate this blocking at the cost of scalability and packet routing/scheduling complexity. Furthermore, because of VLSI technology limitations, fully buffered switches are usually not scalable or practical to implement.

Researchers are investigating the use of optical interconnects and photonic switching to address some of these scalability limitations. For example, optical interconnects in VLSI switches can provide high-speed communication, and may permit large Clos packet-switching networks to be aggregated, e.g., by connecting smaller electrical switches with optical fiber links. While this architecture may facilitate the implementation of larger Clos packet-switching networks, it typically does not change the nature of the switching contention discussed previously. Indeed, the resulting Clos packet-switching networks usually have all the same congestion and inefficiencies, just at a larger scale.

Alternatively, photonic-switching (or optical-switching) products can eliminate the electrical switching stage in favor of a 'transparent' optical switch, in which data packets are sent via beams of light from any input port to an arbitrary output port. While the speed and latency of transmission of these photonic-switching products are low, the input port and the output port contention issues (and, thus, the inefficiencies) remain.

Hence, what is needed is a switch without the above-described problems.

SUMMARY

One embodiment of the present disclosure provides a macro-switch that includes a first integrated circuit. This first integrated circuit has a surface and includes: first switch sites, where each of the first switch sites includes first control logic and a first memory buffer; and second switch sites, where each of the second switch sites includes second control logic and a second memory buffer. Moreover, the macro-switch includes a second integrated circuit having a second surface facing the surface. The second integrated circuit includes: optical ports that can be coupled to optical sources; optical waveguides optically coupled to the optical ports and the first switch sites; and second optical waveguides optically coupled to the first switch sites and the second switch sites. Note that the macro-switch has a fully connected topology between the first switch sites and the second switch sites.

For example, the macro-switch may include a cross-point switch. Moreover, the macro-switch may be non-blocking.

During operation, the first control logic at a given first switch site may determine a given first switching schedule for the given first switch site, and the second control logic at the given second switch site may determine a given second switching schedule for the given second switch site. Note that the given first switching schedule may be determined independently from other switching schedules for the first switch sites and the second switch sites, and the given second switching schedule may be determined independently from the other switching schedules for the first switch sites and the second switch sites.

Furthermore, the optical waveguides between a given optical port and a given first switch site may include one optical waveguide that, during operation, conveys information from the given optical port to the given first switch site and another optical waveguide that, during operation, conveys information from the given first switch site to the given optical port.

Additionally, the second optical waveguides between a given first switch site and the given second switch site may include one optical waveguide that, during operation, conveys information from the given first switch site to the given second switch site and another optical waveguide that, during operation, conveys information from the given second switch site to the given first switch site.

Note that the optical coupling may involve: a diffraction grating, a mirror, and/or optical proximity communication.

Moreover, the given first switch site may include transceivers that, during operation, convert input optical signals into input electrical signals and output electrical signals into output optical signals. Furthermore, the given second switch site may include second transceivers that, during operation, convert second input optical signals into second input electrical signals and second output electrical signals into second output optical signals.

In some embodiments, the second integrated circuit includes: a substrate; a buried-oxide (BOX) layer disposed on the substrate; and a semiconductor layer disposed on the BOX layer, where the optical waveguides and the second optical waveguides are, at least in part, implemented in the semiconductor layer. For example, the substrate, the BOX layer and the semiconductor layer may constitute a silicon-on-insulator technology.

Another embodiment provides a system that includes: a processor; a memory that stores a program module; and the macro-switch. During operation, the program module is executed by the processor.

Another embodiment provides a method for switching optical signals using a macro-switch. During operation, the macro-switch conveys optical signals in optical waveguides in a second integrated circuit in the macro-switch. Then, the macro-switch optically couples the optical signals from the optical waveguide to and from switch sites in a first integrated circuit in the macro-switch, where a given switch site includes control logic and a memory buffer, and where the control logic determines a switching schedule independently of other switch sites in the macro-switch. Moreover, at the given switch site, the macro-switch: converts an optical signal to an electrical signal, performs switching, and converts the electrical signal into the optical signal, where the electrical signal is selectively stored in the memory buffer to avoid contention in the macro-switch.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a macro-switch, a system that includes the macro-switch, and a technique for switching optical signals using the macro-switch are described. The macro-switch may include facing integrated circuits, one of which implements optical waveguides that convey optical signals, and the other which implements control logic, electrical switches and memory buffers at each of multiple switch sites. Moreover, the macro-switch may have a fully connected topology between the switch sites. Furthermore, the memory buffers at each switch site provide packet buffering and congestion relief without causing undue scheduling/routing complexity.

Consequently, the macro-switch can be scaled to an arbitrarily large switching matrix (i.e., an arbitrary number of switch sites and/or switching stages). For example, the macro-switch may have a 4096×4096 switching matrix (which is 6,700× larger than existing photonic switches). Furthermore, the macro-switch may have a small footprint and improved switch performance. In particular, the macro-switch may provide a low-power, high-bandwidth non-blocking electro-optical switch-on-a-chip.

In the discussion that follows, a folded-Clos (fat-tree) packet-switching network is used as an illustration in the macro-switch. However, the switching technique may be used with a wide variety of switch designs and architectures.

Figure 1:
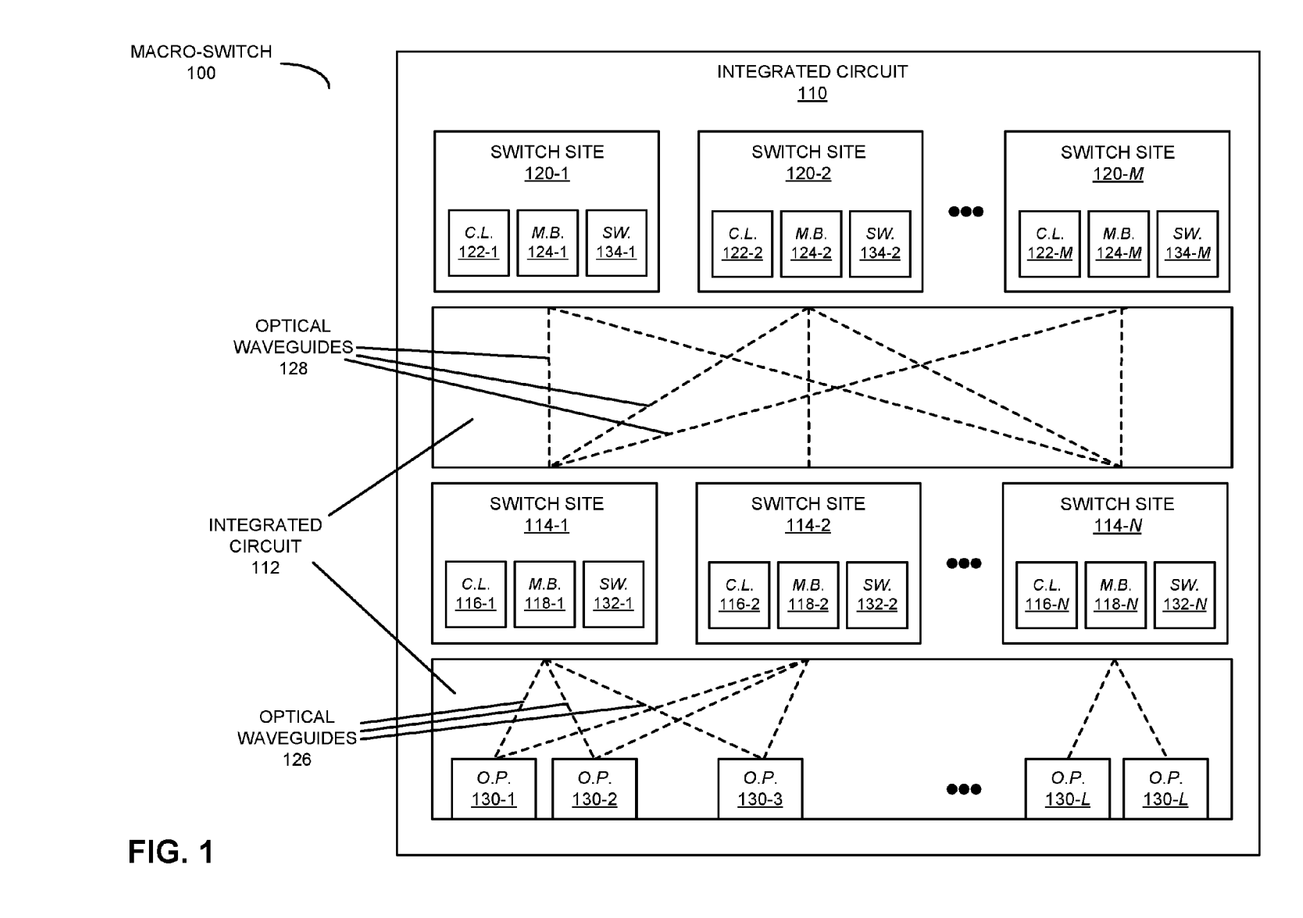
FIG. 1 is a block diagram illustrating a top view of a macro-switch in accordance with an embodiment of the present disclosure.

We now describe embodiments of the macro-switch. FIG. 1 presents a block diagram illustrating a top view of a macro-switch 100, with integrated circuits 110 and 112. Integrated circuit 110 may include: multiple switch sites 114 (which are sometimes referred to as 'leaf switch sites') that each include or are associated with instances of control logic (C.L.) 116 and memory buffers (M.B.) 118; and multiple switch sites 120 (which are sometimes referred to as 'spine switch sites') that each include or are associated with instances of control logic (C.L.) 122 and memory buffers (M.B.) 124. Moreover, integrated circuit 112 may include optical waveguides 126 and 128. These optical waveguides may optically couple optical ports (O.P.) 130 (which can be optically coupled to optical fibers or additional optical waveguides, and more generally to sources and sinks of optical signals) and switch sites 114. Furthermore, optical waveguides 128 may optically couple switch sites 114 and 120.

Figure 2:
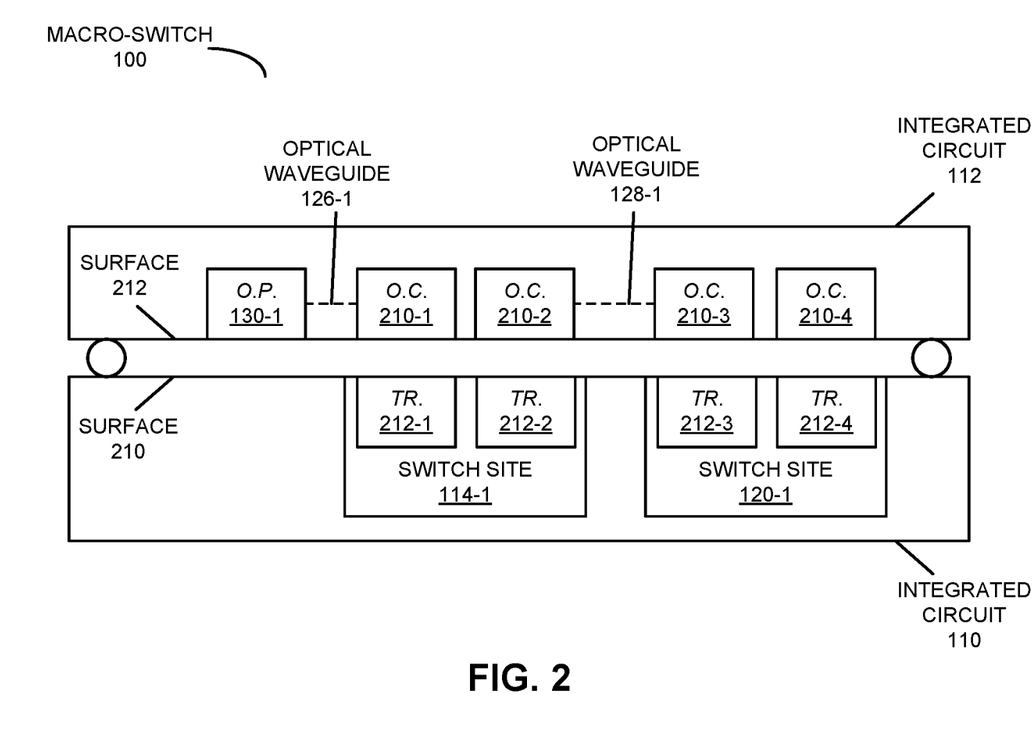
FIG. 2 is a block diagram illustrating a side view of the macro-switch of FIG. 1 in accordance with an embodiment of the present disclosure.

As shown in FIG. 2, which presents a block diagram illustrating a side view of macro-switch 100, integrated circuits 110 and 112 have surfaces 210 and 212 that face each other. A given switch site in switch sites 114 in FIG. 1 (such as switch site 114-1) may be optically coupled to a given one of optical ports 130 in FIG. 1 (such as optical port 130-1) by at least one of optical waveguides 126 in FIG. 1 (such as optical waveguide 126-1 in FIG. 2). For example, there may be one optical waveguide that conveys optical signals between optical port 130-1 and switch site 114-1, and another optical waveguide that conveys optical signals between switch site 114-1 and optical port 130-1. Thus, optical waveguides 126 and 128 (FIG. 1) may convey optical signals unidirectionally. (However, in other embodiments optical waveguides 126 and 128 in FIG. 1 convey optical signals bidirectionally.)

Input optical signals may be optically coupled from integrated circuit 112 to integrated circuit 110 by optical couplers. For example, an input optical signal conveyed using optical waveguide 126-1 may be optically coupled to switch site 114-1 by optical coupler (O.C.) 210-1. This optical coupler may include a diffraction grating and/or a mirror. In some embodiments, the optical coupling involves optical proximity communication, in which a vertical spacing between integrated circuits 110 and 112 is less than or on the same order as one or more carrier wavelengths of optical signals that are optically coupled between integrated circuits 110 and 112.

Moreover, at switch sites 114 (FIG. 1), the input optical signals may be converted into electrical signals by transceivers. For example, the input optical signal from optical coupler 210-1 may be converted into an electrical signal by transceiver (TR.) 212-1. As described further below with reference to FIG. 3, one or more packets associated with this electrical signal may be processed by an instance of control logic 116 (FIG. 1) and may be selectively stored in an instance of memory buffers 118 (FIG. 1) to avoid contention in macro-switch 100.

When macro-switch 100 is ready for a particular packet (e.g., based on a switching schedule of switch site 114-1), the instance of control logic 116 (FIG. 1) may: set an appropriate routing or switching state of a switch at switch site 114-1 (such as switch 132-1 in switches (SW.) 132 in FIG. 1); optionally access the packet in the instance of memory buffers 118 (FIG. 1); and output an associated electrical signal. This electrical signal may be converted into an optical signal by transceiver 212-2.

Moreover, this optical signal may be optically coupled from integrated circuit 110 into at least one of optical waveguides 128 in FIG. 1 (such as optical waveguide 128-1 in FIG. 2) by optical coupler 210-2. Then, optical waveguide 128-1 may convey the optical signal to a given switch site in switch sites 120 in FIG. 1 (such as switch site 120-1).

Next, the optical signal may be optically coupled from integrated circuit 112 to switch site 120-1 by optical coupler 210-3. Furthermore, at switch sites 120-1, the optical signal may be converted into an electrical signal by transceiver 212-3. As described further below with reference to FIG. 3, one or more packets associated with this electrical signal may be processed by an instance of control logic 122 (FIG. 1) and may be selectively stored in an instance of memory buffers 124 (FIG. 1) to avoid contention in macro-switch 100.

When macro-switch 100 is ready for a particular packet (e.g., based on a switching schedule of switch site 120-1), the instance of control logic 122 (FIG. 1) may: set an appropriate routing or switching state of a switch at switch site 120-1 (such as switch 134-1 in switches (SW.) 134 in FIG. 1); optionally access the packet in the instance of memory buffers 124 (FIG. 1); and output an associated electrical signal. This electrical signal may be converted into an optical signal by transceiver 212-4.

Furthermore, this optical signal may be optically coupled from integrated circuit 110 into at least one of optical waveguides 128 in FIG. 1 (which may be different from or other than optical waveguide 128-1) by optical coupler 210-4.

The aforementioned operations may then be repeated as the optical signal is conveyed to another one of switch sites 114 (FIG. 1), where it is eventually routed as an output optical signal to one of optical ports 130 (FIG. 1). As noted previously, in general the return path from switch site 120-1 to the one of the optical ports 130 in FIG. 1 may involve different optical waveguides in optical waveguides 126 and 128, and a different one of switch sites 114 in FIG. 1.

Referring back to FIG. 1, an instance of control logic 116 at a given switch site in switch sites 114 may determine a given switching schedule for this (local) switch site, and an instance of control logic 122 at a given switch site in switch sites 120 may determine a given switching schedule for this (local) switch site. Note that the switching schedules may be determined independently of each other (i.e., independently of any other switching schedule in macro-switch 100).

In some embodiments, macro-switch 100 provides a fully connected topology between switch sites 114 and 120. For example, macro-switch 100 may include a cross-point switch, which can support one-to-many or even all-to-all (full-mesh) connectivity among switch sites 114 and 120. (Note that optical waveguides 126 and 128 may be laid out in concentric circles in macro-switch 100 to avoid optical waveguide crossing.) Moreover, by using memory buffers 118 and 124, macro-switch 100 may be non-blocking and, thus, may offer high throughput.

In an exemplary embodiment, the macro-switch is used in a distributed compute environment (such as an enterprise data center or a modern supercomputer). In such compute environments, communication between compute nodes can be a bottleneck, both in bandwidth and latency. In order to minimize latency and congestion, a non-blocking network configuration is often employed, such as a folded-Clos (fat-tree) network with full-bisection bandwidth.

However, for applications with low locality (such as those that occur in many data-center applications), in order to construct a system where the network bandwidth does not constrain the performance, the network switching can be a sizable or even a dominant component of the overall system power consumption.

Modern distributed compute environments typically use electronic switches, such as an existing Infiniband electronic switch. For example, an existing Infiniband electronic switch can provide full non-blocking bisection bandwidth with a switching capacity of 130 Tbps (which, as described further below, may approximately equal that of some embodiments of macro-switch 100). Alternatively, researchers are investigating photonic switching based on a variety of switching techniques (such as MEMS, acousto-optical, magneto-optical, etc.) to steer optical inputs to optical outputs. For example, a MEMS-based silicon photonic switch capable of switching 50 input ports to 50 output ports has been demonstrated. However, this is orders of magnitude smaller than macro-switch 100, and a MEMS-based silicon photonic switch typically has a sub-microsecond switch time that is 2-3 orders of magnitude slower than the effective switch speed of the electro-optical switch sites used in macro-switch 100.

Macro-switch 100 may use: silicon-photonics links (such as optical waveguides) that provide direct point-to-point connectivity between any two switch sites; switching nodes at each switch site to build an arbitrarily large switching matrix (i.e., an arbitrary number of switches per stage and an arbitrary number of stages); and memory buffers at each switch site to provide packet buffering and congestion relief without causing undue scheduling/routing complexity. The result may be a low-power, high-bandwidth, non-blocking electro-optical switch-on-a-chip. For example, a macro-switch with 131 Tbps switching capacity, capable of switching 4096 inputs to 4096 outputs, can be placed on a single 20×20 cm silicon substrate with an 11× power savings over conventional systems. Note that the ability to place memory in switching modules may significantly improve the performance of macro-switch 100.

In particular, macro-switch 100 may include: switching and memory at each switch site; a photonic point-to-point interconnect; and a logical distribution of input and output ports across the switch sites. Moreover, control logic (such as processors or logic circuits) at each switch site may: examine each incoming packet; look at the packet destination; determine where to send the packet based on routing information; determine when to send the packet; selectively store the packet in local memory in the interim; and, when ready to send, select the appropriate outgoing photonic link based on the routing table information.

In some embodiments, the point-to-point interconnect is implemented using silicon photonics, and employs wavelength-division multiplexing and embedded optical waveguides. Moreover, the memory buffers at the switch sites may use one or more of a variety of types of memory, such as: DRAM, SRAM, EEPROM, flash, another type of non-volatile memory and/or another type of volatile memory.

Note that macro-switch 100 may use a mix of electronics and silicon photonics to achieve high bandwidth while keeping the power cost low. In particular, macro-switch 100 may use an on-chip network of switch sites that are optically connected by optical waveguides. In contrast with the existing Infiniband electronic switch (which, in conjunction with outbound optical fiber connections, can have power consumption of 9.16 kW), macro-switch 100 (in conjunction with the outbound optical fiber connections) may have a power consumption of 835 W (which is 11× smaller) for equivalent switching capacity. In addition, macro-switch 100 may be implemented using a single substrate, while the existing Infiniband electronic switch may require a 28U chassis weighing almost a half a metric ton (496 kg).

An exemplary embodiment of the macro-switch may be implemented using a square silicon substrate that is 20 cm on a side. Consequently, the perimeter of this macro-switch may total 800 mm. With an estimated effective optical fiber pitch of 300 µm, this may allow for approximately 2500 total optical fibers to be connected along the periphery (leaving approximately a 6 mm buffer at the corners of the chip). 826 of these optical fibers may be used to provide external laser power to the internal optical waveguides of the macro-switch. Of the remaining optical fibers, 1536 may be used to provide 512 input/output optical fiber pairs, with a third optical fiber per pair providing the external laser power for the output fiber. Moreover, each of the input/output optical fibers may convey or carry eight carrier wavelengths at 16 Gbps per carrier wavelength, for a total of 4096 input/output carrier-wavelength pairs. This may provide a total of 65.5 Tbps input bandwidth plus 65.5 Tbps output bandwidth per macro-switch.

Referring back to FIG. 1. macro-switch 100 may have a folded-Clos (fat-tree) internal connectivity. (Note that FIG. 1 is intended to depict a block diagram of the functionality of macro-switch 100, not the actual physical layout.) In particular, the internal structure of macro-switch 100 may include 67 switch sites (including 43 leaf switch sites and 24 spine switch sites) that are connected with silicon-photonics optical waveguides. Optical proximity communication may optically couple the switch sites to the optical layers in integrated circuit 112 that routes the optical links, both for the internal optical waveguides and for the external optical fiber. As noted previously, power for the on-chip silicon-photonics interconnection network may be provided by off-macro-switch lasers that are connected through optical fibers to the sides of the macro-switch.

Moreover, the internal macro-switch topology may use a folded-Clos (fat-tree) among switch sites to provide non-blocking full-bisection bandwidth. In some embodiments, each connection between any two of the switch sites is bidirectional, with a specified number of optical waveguides and carrier wavelengths in each direction. For example, the macro-switch may include: 16 optical ports to 16 optical fibers that each convey 128 carrier wavelengths; 43 optical waveguides in each direction between the optical ports and the leaf switch sites, each of which conveys four carrier wavelengths (for a total of 192 carrier wavelengths); and 192 optical waveguides in each direction between the leaf switch sites and the spine switch sites, each of which conveys one carrier wavelength (once again, for a total of 192 carrier wavelengths). Thus, each leaf switch site and each spine switch site can connect up to 192 bidirectional carrier-wavelength pairs.

Figure 3:
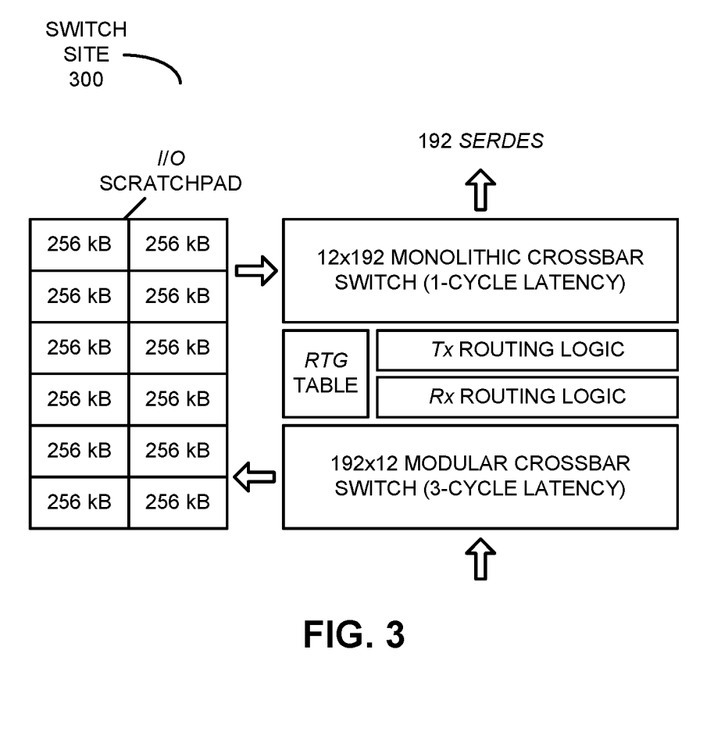
FIG. 3 is a block diagram illustrating a layout of a switch site in the macro-switch of FIG. 1 in accordance with an embodiment of the present disclosure.

FIG. 3 presents a block diagram illustrating a layout of a switch site 300 in macro-switch 100 (FIGS. 1 and 2). This switch site may include 192 optical serializers/deserializers (SERDES), with one per bidirectional carrier-wavelength pair. Moreover, switch site 300 may include transmitter (Tx) routing or control logic that may examine the destination of each outgoing message or packet, and may select the outgoing carrier wavelength based on a routing table. Once the carrier wavelength is selected, the message may be sent to its queue, and the serializer may start modulating the carrier wavelength based on the message bits or the data.

Furthermore, switch site 300 may include receiver (Rx) routing or control logic that may: examine the destination of each incoming message or packet, copy the message into an input/output (I/O) scratchpad, and copy the information in the message into the queue for the transmitter routing logic.

Note that the routing (RTG) table at switch site 300 may provide a mapping between the destination-site identifier and one or more carrier wavelengths that are associated with the destination, and which are used to convey messages or packets to the destination. Additionally, the input/output scratchpad may be an SRAM-based scratchpad that provides direct-addressable storage for messages. For example, the input/output scratchpad may be 3 MB. In order to provide high throughput, the input/output scratchpad may be organized into 12 banks, where each bank can serve data independently to the receiver and transmitter multiplexers. (Note that the banks may be accessed simultaneously in a fully pipelined manner.)

Moreover, switch site 300 may include input and output crossbars between the serializers/deserializers and the input/output scratchpad.

In an exemplary embodiment, each switch site in the macro-switch is estimated to occupy approximately 20 mm$^2$ and consumes under 8 W.

In order for the internal switch network to be non-blocking, each leaf switch site may have 96 bidirectional carrier-wavelength pairs that connect to the external optical fiber, and 96 bidirectional carrier-wavelength pairs that connect to the spine switch sites. Because the periphery of the macro-switch can have a total of 4096 bidirectional carrier-wavelength pairs, a total of 43 leaf switch sites may be needed to connect to the external optical fiber connections. (Note that the 43 leaf switch sites, each with 96 external bidirectional carrier-wavelength pairs, may connect to up to 4128 bidirectional carrier-wavelength pairs.)

Moreover, in order to provide non-blocking full-bisection bandwidth, the remaining 96 wavelengths (in each direction) of each leaf switch site may be distributed across all of the spine switch sites. Furthermore, each spine site may have one optical waveguide that contains or conveys four carrier wavelengths (per direction) connected to each leaf site. Because a spine switch site may have a maximum connectivity of 192 wavelengths in one direction, the macro-switch may need a total of 24 spine switches to connect all leaf switches in a non-blocking full-bisection bandwidth configuration. Furthermore, because the maximum total traffic through each switch site may be 384 GB/s, and assuming that each switch site operates at a nominal frequency of 1 GHz, each switch site may need a 3 MB input/output scratchpad with 12 banks (256 KB/bank).

Note that the total number of optical waveguides needed to internally connect the switch sites may be approximately half the number for a macro-switch. Moreover, the total power consumption per macro-switch, including the power required for the internal optical waveguides, but excluding the power required for outgoing optical fibers, may be approximately 759 W. If 10% additional power is included for cooling, the power consumption per macro-switch is approximately 835 W.

One consideration in the design of the macro-switch is the location of the laser sources to power the photonic links. These laser sources can be placed either outside the macro-switch or as on-chip lasers within the macro-switch. When on-chip lasers are used, additional power saving can be obtained. In particular, because only a subset of the on-macro-switch point-to-point links are typically used at any given moment due to the fully connected point-to-point architecture, it is possible to provision a set of M tunable lasers per N-channel wavelength-division-multiplexing link (where M is less than N) to deliver power to any arbitrary subset of M links by tuning to the correct set of carrier wavelengths. The links may be almost fully provisioned so that M is almost equal to N (i.e., the number of tunable laser outputs may be sufficient to power almost all links at any given point in time) or, in general, optimally provisioned so that the number of tunable laser outputs M is chosen so that laser (and, hence, power) utilization is optimized. Note that there may be a tuning delay (e.g., less than 100 ns) associated with tuning the M channels to the requisite carrier wavelengths. In general, this approach may allow power efficiency to be traded off for available bandwidth.

Figure 4:
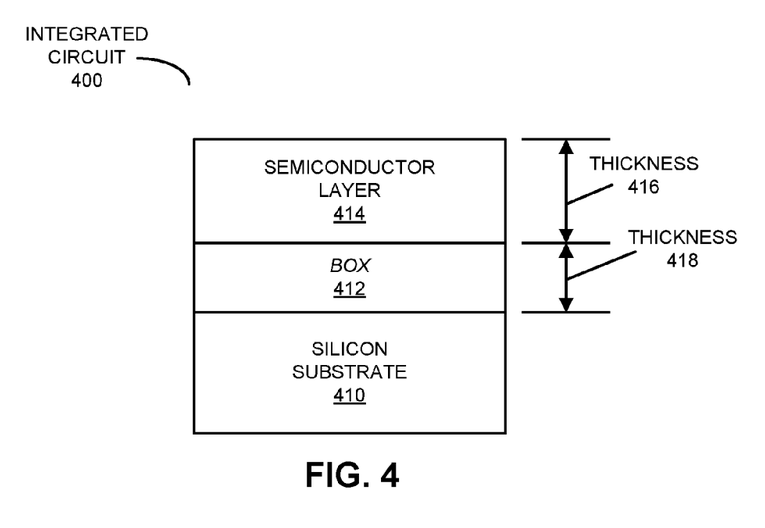
FIG. 4 is a block diagram illustrating an integrated circuit in the macro-switch of FIG. 1 in accordance with an embodiment of the present disclosure.

As discussed previously, the macro-switch may include optical waveguides implemented in an integrated circuit, such as a photonic integrated circuit. FIG. 4 presents a block diagram illustrating an integrated circuit 400. This integrated circuit includes: a substrate 410, a buried-oxide (BOX) layer 412 disposed on substrate 410, and a semiconductor layer 414 disposed on buried-oxide layer 412. Optical components such as the optical waveguides may, at least in part, be included in buried-oxide layer 412 and semiconductor layer 414. In an exemplary embodiment, substrate 410 and semiconductor layer 414 include silicon and buried-oxide layer 412 includes silicon dioxide. Thus, substrate 410, buried-oxide layer 412 and semiconductor layer 414 may constitute a silicon-on-insulator technology.

Moreover, semiconductor layer 414 may have a thickness 416 that is less than 1 μm (such as 0.2-0.3 μm). Furthermore, buried-oxide layer 412 may have a thickness 418 between 0.3 and 3 μm (such as 0.8 μm). Note that a width of the optical waveguides may be 400-3000 nm. In an exemplary embodiment, the optical waveguides convey an optical signal (i.e., light) having wavelengths between 1.1-1.7 μm, such as an optical signal having a fundamental wavelength of 1.3 or 1.55 μm.

Figure 5:
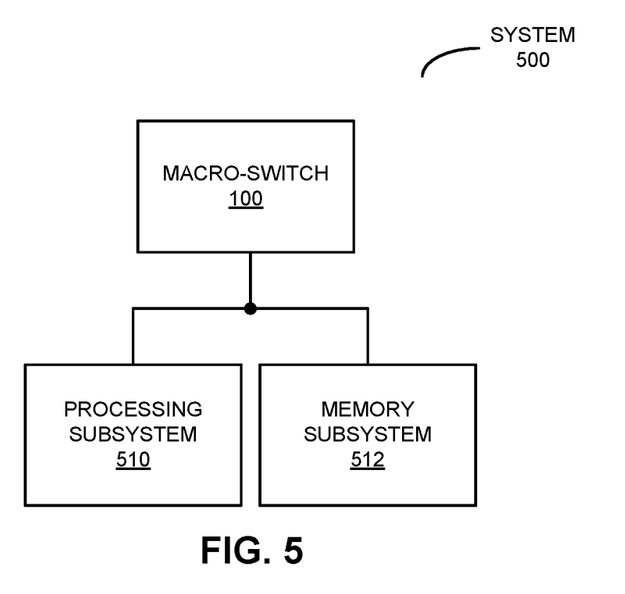
FIG. 5 is a block diagram illustrating a system that includes the macro-switch of FIG. 1 in accordance with an embodiment of the present disclosure.

Macro-switch 100 (FIGS. 1 and 2) may be included in a system and/or an electronic device. This is shown in FIG. 5, which presents a block diagram illustrating a system 500 that includes macro-switch 100. In some embodiments, system 500 includes processing subsystem 510 (with one or more processors) and memory subsystem 512 (with memory).

In general, functions of the integrated circuit and system 500 may be implemented in hardware and/or in software. Thus, system 500 may include one or more program modules or sets of instructions stored in a memory subsystem 512 (such as DRAM or another type of volatile or non-volatile computer-readable memory), which, during operation, may be executed by processing subsystem 510. Note that the one or more computer programs may constitute a computer-program mechanism. Furthermore, instructions in the various modules in memory subsystem 512 may be implemented in: a high-level procedural language, an object-oriented programming language, and/or in an assembly or machine language. Note that the programming language may be compiled or interpreted, e.g., configurable or configured, to be executed by the processing subsystem.

Components in system 500 may be coupled by signal lines, links or buses. These connections may include electrical, optical, or electro-optical communication of signals and/or data. Furthermore, in the preceding embodiments, some components are shown directly connected to one another, while others are shown connected via intermediate components. In each instance, the method of interconnection, or 'coupling,' establishes some desired communication between two or more circuit nodes, or terminals. Such coupling may often be accomplished using a number of circuit configurations, as will be understood by those of skill in the art; for example, AC coupling and/or DC coupling may be used.

In some embodiments, functionality in these circuits, components and devices may be implemented in one or more: application-specific integrated circuits (ASICs), field-programmable gate arrays (FPGAs), and/or one or more digital signal processors (DSPs). Furthermore, functionality in the preceding embodiments may be implemented more in hardware and less in software, or less in hardware and more in software, as is known in the art. In general, system 500 may be at one location or may be distributed over multiple, geographically dispersed locations.

System 500 may include: a VLSI circuit, a switch, a hub, a bridge, a router, a communication system (such as a wavelength-division-multiplexing communication system), a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a tablet computer, a supercomputer, a network-attached-storage (NAS) system, a storage-area-network (SAN) system, a media player (such as an MP3 player), an appliance, a subnotebook/netbook, a tablet computer, a smartphone, a cellular telephone, a network appliance, a set-top box, a personal digital assistant (PDA), a toy, a controller, a digital signal processor, a game console, a device controller, a computational engine within an appliance, a consumer-electronic device, a portable computing device or a portable electronic device, a personal organizer, and/or another electronic device. In some embodiments, macro-switch 100 and/or system 500 perform the functions of: a switch, a hub, a bridge, and/or a router.

Furthermore, the embodiments of macro-switch 100 and/or system 500 may include fewer components or additional components. Although these embodiments are illustrated as having a number of discrete items, these optical components, integrated circuits and the system are intended to be functional descriptions of the various features that may be present rather than structural schematics of the embodiments described herein. Consequently, in these embodiments two or more components may be combined into a single component, and/or a position of one or more components may be changed. In addition, functionality in the preceding embodiments of macro-switch 100 and/or system 500 may be implemented more in hardware and less in software, or less in hardware and more in software, as is known in the art.

While the preceding embodiments have been illustrated with particular elements and compounds, a wide variety of materials and compositions (including stoichiometric and non-stoichiometric compositions) may be used, as is known to one of skill in the art. Thus, while a silicon optical waveguide was illustrated in the preceding embodiments, the switching technique may be used with other materials, as is known to one of skill in the art. Moreover, the semiconductor layer may include polysilicon or amorphous silicon. Additionally, the materials and compounds in the macro-switch may be fabricated using a wide variety of processing techniques, including: evaporation, sputtering, molecular-beam epitaxy, chemical vapor deposition, wet or dry etching (such as photolithography or direct-write lithography), polishing, etc. More generally, components in macro-switch 100 may be defined using an additive process (i.e., material deposition) and/or a subtractive process (i.e., material removal), and these components may be fabricated using a wide variety of materials, including: a semiconductor, metal, glass, sapphire, silicon dioxide, organic materials, inorganic materials, a resin and/or polymers. In addition, a wide variety of optical components may be used in or in conjunction with macro-switch 100.

Figure 6:
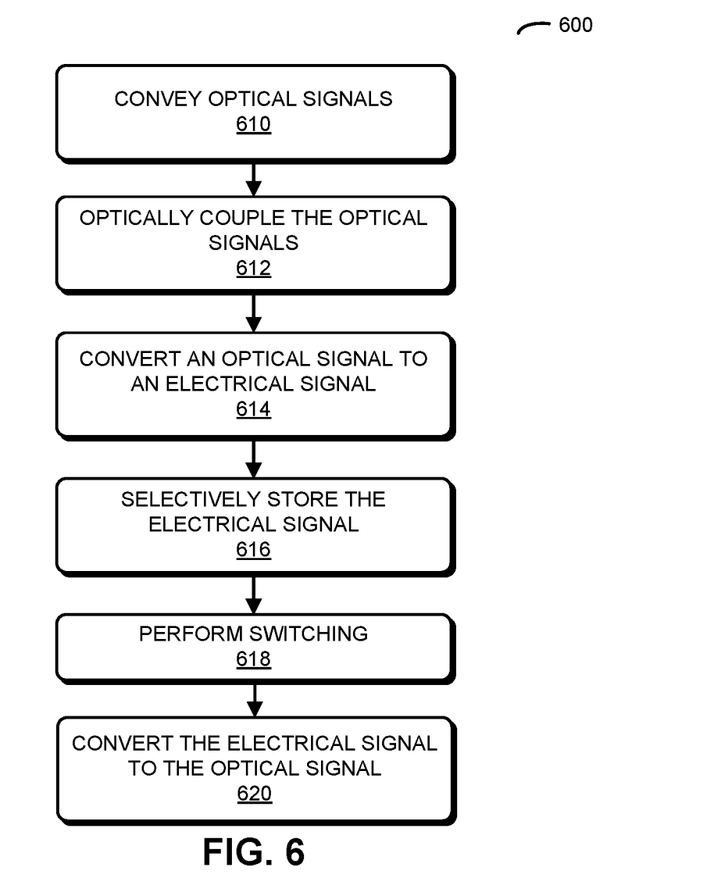
FIG. 6 is a flow chart illustrating a method for switching optical signals using a macro-switch in accordance with an embodiment of the present disclosure.

We now describe embodiments of a method. FIG. 6 presents a flow chart illustrating a method 600 for switching optical signals using a macro-switch, such as macro-switch 100 (FIGS. 1 and 2). During operation, the macro-switch conveys the optical signals (operation 610) in optical waveguides in a second integrated circuit in the macro-switch. Then, the macro-switch optically couples the optical signals (operation 612) from the optical waveguide to and from switch sites in a first integrated circuit in the macro-switch, where a given switch site includes control logic and a memory buffer, and where the control logic determines a switching schedule independently of other switch sites in the macro-switch. Moreover, at the given switch site, the macro-switch: converts an optical signal to an electrical signal (operation 614), performs switching (operation 618), and converts the electrical signal into the optical signal (operation 620), where the electrical signal is selectively stored (operation 616) in the memory buffer to avoid contention in the macro-switch.

In some embodiments of method 600, there may be additional or fewer operations. Moreover, the order of the operations may be changed, and/or two or more operations may be combined into a single operation.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A macro-switch, comprising:
a first integrated circuit having a surface, wherein the first integrated circuit comprises:
first switch sites, wherein each of the first switch sites includes first control logic and a first memory buffer; and
second switch sites, wherein each of the second switch sites includes second control logic and a second memory buffer; and
a second integrated circuit having a second surface facing the surface, wherein the second integrated circuit comprises:
optical ports configured to couple to optical sources;
optical waveguides optically coupled to the optical ports and the first switch sites; and
second optical waveguides optically coupled to the first switch sites and the second switch sites, wherein the macro-switch has a fully connected topology between the first switch sites and the second switch sites.

2. The macro-switch of claim 1, wherein the macro-switch includes a cross-point switch.

3. The macro-switch of claim 1, wherein the macro-switch is non-blocking.

4. The macro-switch of claim 1, wherein, during operation, the first control logic at a given first switch site determines a given first switching schedule for the given first switch site; and
wherein, during operation, the second control logic at a given second switch site determines a given second switching schedule for the given second switch site.

5. The macro-switch of claim 4, wherein the given first switching schedule is determined independently from other switching schedules for the first switch sites and the second switch sites; and wherein the given second switching schedule is determined independently from the other switching schedules for the first switch sites and the second switch sites.

6. The macro-switch of claim 1, wherein the optical waveguides between a given optical port and a given first switch site include one optical waveguide that, during operation, conveys information from the given optical port to the given first switch site and another optical waveguide that, during operation, conveys information from the given first switch site to the given optical port.

7. The macro-switch of claim 1, wherein the second optical waveguides between a given first switch site and a given second switch site include one optical waveguide that, during operation, conveys information from the given first switch site to the given second switch site and another optical waveguide that, during operation, conveys information from the given second switch site to the given first switch site.

8. The macro-switch of claim 1, wherein the optical coupling involves one of: a diffraction grating, a mirror, and optical proximity communication.

9. The macro-switch of claim 1, wherein a given first switch site includes transceivers that, during operation, convert input optical signals into input electrical signals and output electrical signals into output optical signals; and
wherein a given second switch site includes second transceivers that, during operation, convert second input optical signals into second input electrical signals and second output electrical signals into second output optical signals.

10. The macro-switch of claim 1, wherein the second integrated circuit comprises:
a substrate;
a buried-oxide (BOX) layer disposed on the substrate; and
a semiconductor layer disposed on the BOX layer, wherein the optical waveguides and the second optical waveguides are, at least in part, implemented in the semiconductor layer.

11. The macro-switch of claim 1, wherein the substrate, the BOX layer and the semiconductor layer constitute a silicon-on-insulator technology.

12. A system, comprising:
a processor;
a memory, coupled to the processor, that stores a program module, which, during operation, is executed by the processor; and
a macro-switch, wherein the macro-switch comprises:
a first integrated circuit having a surface, wherein the first integrated circuit comprises:
first switch sites, wherein each of the first switch sites includes first control logic and a first memory buffer; and
second switch sites, wherein each of the second switch sites includes second control logic and a second memory buffer; and
a second integrated circuit having a second surface facing the surface, wherein the second integrated circuit comprises:
optical ports configured to couple to optical sources;
optical waveguides optically coupled to the optical ports and the first switch sites; and
second optical waveguides optically coupled to the first switch sites and the second switch sites, wherein the macro-switch has a fully connected topology between the first switch sites and the second switch sites.

13. The system of claim 12, wherein the macro-switch includes a cross-point switch; and
wherein the macro-switch is non-blocking.

14. The system of claim 12, wherein, during operation, the control logic at a given first switch site determines a given first switching schedule for the given first switch site; and
wherein, during operation, the second control logic at a given second switch site determines a given second switching schedule for the given second switch site.

15. The system of claim 14, wherein the given first switching schedule is determined independently from other switching schedules for the first switch sites and the second switch sites; and
wherein the given second switching schedule is determined independently from the other switching schedules for the first switch sites and the second switch sites.

16. The system of claim 12, wherein the optical waveguides between a given optical port and a given first switch site include one optical waveguide that, during operation, conveys information from the given optical port to the given first switch site and another optical waveguide that, during operation, conveys information from the given first switch site to the given optical port.

17. The system of claim 12, wherein the second optical waveguides between a given first switch site and a given second switch site include one optical waveguide that, during operation, conveys information from the given first switch site to the given second switch site and another optical waveguide that, during operation, conveys information from the given second switch site to the given first switch site.

18. The system of claim 12, wherein a given first switch site includes transceivers that, during operation, convert input optical signals into input electrical signals and output electrical signals into output optical signals; and
wherein a given second switch site includes second transceivers that, during operation, convert second input optical signals into second input electrical signals and second output electrical signals into second output optical signals.

19. The system of claim 12, wherein the second integrated circuit comprises:
a substrate;
a buried-oxide (BOX) layer disposed on the substrate; and
a semiconductor layer disposed on the BOX layer, wherein the optical waveguides and the second optical waveguides are, at least in part, implemented in the semiconductor layer.

20. A method of switching optical signals using a macro-switch, wherein the method comprises:
conveying optical signals in optical waveguides in a second integrated circuit in the macro-switch;
optically coupling the optical signals from the optical waveguide to and from switch sites in a first integrated circuit in the macro-switch, wherein a given switch site includes control logic and a memory buffer, and wherein the control logic determines a switching schedule independently of other switch sites in the macro-switch; and
at the given switch site, converting an optical signal to an electrical signal, performing switching, and converting the electrical signal into the optical signal, wherein the electrical signal is selectively stored in the memory buffer to avoid contention in the macro-switch.

* * * * *

UNITED STATES PATENT AND TRADEMARK OFFICE
CERTIFICATE OF CORRECTION

PATENT NO. : 9,693,124 B2
APPLICATION NO. : 15/154619
DATED : June 27, 2017
INVENTOR(S) : Robinson et al.

It is certified that error appears in the above-identified patent and that said Letters Patent is hereby corrected as shown below:

In the Specification

In Column 1, Line 54, delete "output-port" and insert -- output port --, therefor.

Signed and Sealed this
Tenth Day of July, 2018

Andrei Iancu
*Director of the United States Patent and Trademark Office*